United States Patent [19]
Seibert et al.

[11] Patent Number: 4,896,623
[45] Date of Patent: Jan. 30, 1990

[54] SIGNAL FLAG

[75] Inventors: Peter Seibert; Kurt Schulzke, both of Hamburg, Fed. Rep. of Germany

[73] Assignee: Alboran Warenvertriebsgesellschaft mbH, Hamburg, Fed. Rep. of Germany

[21] Appl. No.: 117,870

[22] Filed: Nov. 9, 1987

[30] Foreign Application Priority Data

Nov. 13, 1986 [DE] Fed. Rep. of Germany ....... 3638697

[51] Int. Cl.$^4$ ............................................. G09F 17/00
[52] U.S. Cl. ..................................... 116/173; 116/209
[58] Field of Search ................ 116/173, DIG. 40, 209

[56] References Cited

U.S. PATENT DOCUMENTS

| | | | |
|---|---|---|---|
| 416,901 | 12/1989 | Clark | 116/173 |
| 569,024 | 10/1896 | Koch | 116/173 |
| 1,090,070 | 3/1914 | Keene | 116/173 |
| 1,288,060 | 12/1918 | Le Duc | 116/173 |
| 1,305,885 | 6/1919 | Coe | 116/173 |
| 2,452,842 | 11/1948 | Davis | 116/173 |
| 2,458,316 | 1/1949 | Swertlow | 116/173 |
| 3,105,459 | 10/1963 | Conn | 116/209 |
| 3,225,734 | 12/1965 | Bule | 116/173 |
| 4,332,210 | 6/1982 | Lambert | 116/173 |
| 4,348,978 | 9/1982 | Brucato | 116/173 |
| 4,574,726 | 3/1986 | Sullivan | 116/28 R |
| 4,590,883 | 5/1986 | Steed et al. | 116/28 R |

FOREIGN PATENT DOCUMENTS 529692.9 4/1986 Fed. Rep. of Germany .
627642.5 4/1987 Fed. Rep. of Germany .

*Primary Examiner*—William A. Cuchlinski, Jr.
*Assistant Examiner*—Thomas B. Will
*Attorney, Agent, or Firm*—Cushman, Darby & Cushman

[57] ABSTRACT

The invention relates to a signal flag with a flagstaff and an adjoining grip part, the flagstaff being capable of being folded into the case and the case forming a housing for containing the folded flagstaff and the flag atached thereto. It is characterized, as shown in FIG. 1, in flag 1 consisting of strongly reflective material and the foot of the case 3 containing devices for attaching the signal flag 1 and/or receiving further indication means for emergencies. In a preferred embodiment shown in FIG. 1, the case 3 is conically tapered downwardly and the telescoping flagstaff 2 is attached offset from the center of the foot 4 of the case 3.

6 Claims, 2 Drawing Sheets

SIGNAL FLAG

The invention relates to a novel signal flag for emergencies.

BACKGROUND OF THE INVENTION

There is already a number of signaling devices to draw attention in emergencies or accidents in traffic as well as on the high seas such as, for example, permanently installed or portable emergency blinkers, triangular warning signs, signal cartridges or emergency flares and the like. However, most known devices have the great disadvantages of being relatively large and perhaps even bulky and being dependent on an external energy source such as, for example, electric batteries of the electrical system of an automobile. But experience has shown that, particularly in the case of accidents, external energy sources cannot be counted on. It has furthermore been found time and again that in the case of water accidents involving small boats or surfers possibly available emergency signal devices were not usable because they could not be carried on the body of the victim due to their size and weight and were thus not or no longer available at the time of the accident. There has been no lack of attempts to develop relatively small and easily operable signal devices which could be carried without problems while performing a multitude of tasks. For example, a signal flag for emergencies at sea is known from German Utility Model No. 85 29 692 which is characterized by the flagstaff consisting of interconnected parts which can be folded towards the case forming a housing for keeping the folded flagstaff and the flag fastened thereon. However, the device described in this utility model has the disadvantage that the signal flag, in spite of the striking coloration of the flag, often is hard to see during emergencies at sea, for example, if the accidents occur in fog or rain squalls.

Furthermore, the device is of relatively large size so that it cannot be carried by, for example, surfers, since they feel themselves hampered in their activities by the size and weight of the device. Furthermore it has been found that such devices are of little use in emergency situations on land, and especially in traffic, since they must be held by someone, but the rescuer must have his hands free in emergency situations as a rule and should not be hampered by the signal flag.

SUMMARY OF THE INVENTION

It is therefore an object of the invention to modify a signal flag of the type described above such that the aforementioned disadvantages can be avoided.

To attain this object a signal flag with a flagstaff and an adjoining case is proposed, the flagstaff being foldable into the grip and the grip forming a housing for receiving the folded flagstaff with the flag fastened thereon, being characterized in that the flag is made of strongly reflective material and the foot of the case contains devices for attaching the signal flag and/or for receiving further indication means for emergencies.

The signal flag of the invention consists of a foldable and particularly a telescoping flagstaff with an adjoining grip element, the flagstaff being capable of being folded or telescoped into the case, the case thus serving to receive the flagstaff with the flag fastened thereon. The flag consists of a light-weight, durable and seawater-proof material of high reflectivity; preferably a textile material such as a polyamide cloth is used which is impregnated with strongly reflecting dyes, such as the so-called neon dyes, for example. The colors orange, red or pink are preferably used as warning or alerting colors, additionally, the flag can be marked with an easily noted indication of an emergency, for example the letters SOS. The foot of the case of the signal flag has devices for attaching the signal flag and/or receiving further indication means for emergencies. It has been found to be particularly important in traffic situations to be able to attach the signal flag in a clearly visible manner to, for example, disabled vehicles. This is achieved by providing the foot of the case with a slit the inside width of which corresponds to the thickness of normal automotive window glass, so that the foot can be inserted, for example, into a partially lowered window of the motor vehicle. In this manner the signal flag can be displayed not only when stopped, but also when driving at slow speed in order to alert following or approaching vehicles in good time to an unusual situation. In case of emergencies at sea, such as are increasingly found, for example, in surfing, the foot of the grip part can also be preferably provided with an adapter for launchers for signal cartridges, for example.

The case serving as a housing in the folded state is closed by a cap on which the flag and the upper end of the flagstaff are fastened. The connection between cap and grip element is provided in the form of a slide lock since it has been shown that it must also be possible, for example in emergencies on the water, to unfold the signal flag without use of the hands by, for example turning the cap with the teeth. Preferably the cap itself also is made of a strongly reflective material or is provided with such a material on the inside and outside, since this constitutes an additional possibility to attract the attention of rescuers.

The flag can also additionally be provided with bands of such reflective material in order to increase visibility under various light angles.

The case of the signal flag according to the invention is preferably formed with a cone-shaped widening towards the top and the telescoping flagstaff is fastened offset from the center of the foot of the case since it has been found that the stowing of the flagstaff and flag in an annular space between flagstaff and inner wall of the grip part is structurally difficult and expensive in the previously mentioned devices. Therefore it is much simpler if the telescoping flagstaff is fastened offset from the center of the foot element, since in this way more space is available for stowing the flag. Also a cone-shaped narrowing towards the foot has been found practical, since in this way additional space for keeping the flag can be obtained. In order to prevent the eccentrically fastened flagstaff from following the turning movement of the cap when the latter is removed from the case, attachment of the flagstaff to the cap is provided via a pivotable intermediate element.

The signal flag according to the invention is preferably mainly made of plastic material, since this makes possible a considerable savings in weight. The device can be of such size that in a housing of approximately 20 cm in length with a diameter of approximately 4 to 5 cm a flag measuring approximately 70 to 80×50 to 60 cm can be stowed. Thus it is particularly suitable for carrying as a personal signal and rescue means in traffic as well as on the water.

The invention is described in detail below by means of the drawings.

DETAILED DESCRIPTION OF THE PREFERRED EMBODIMENT

Figure 1:
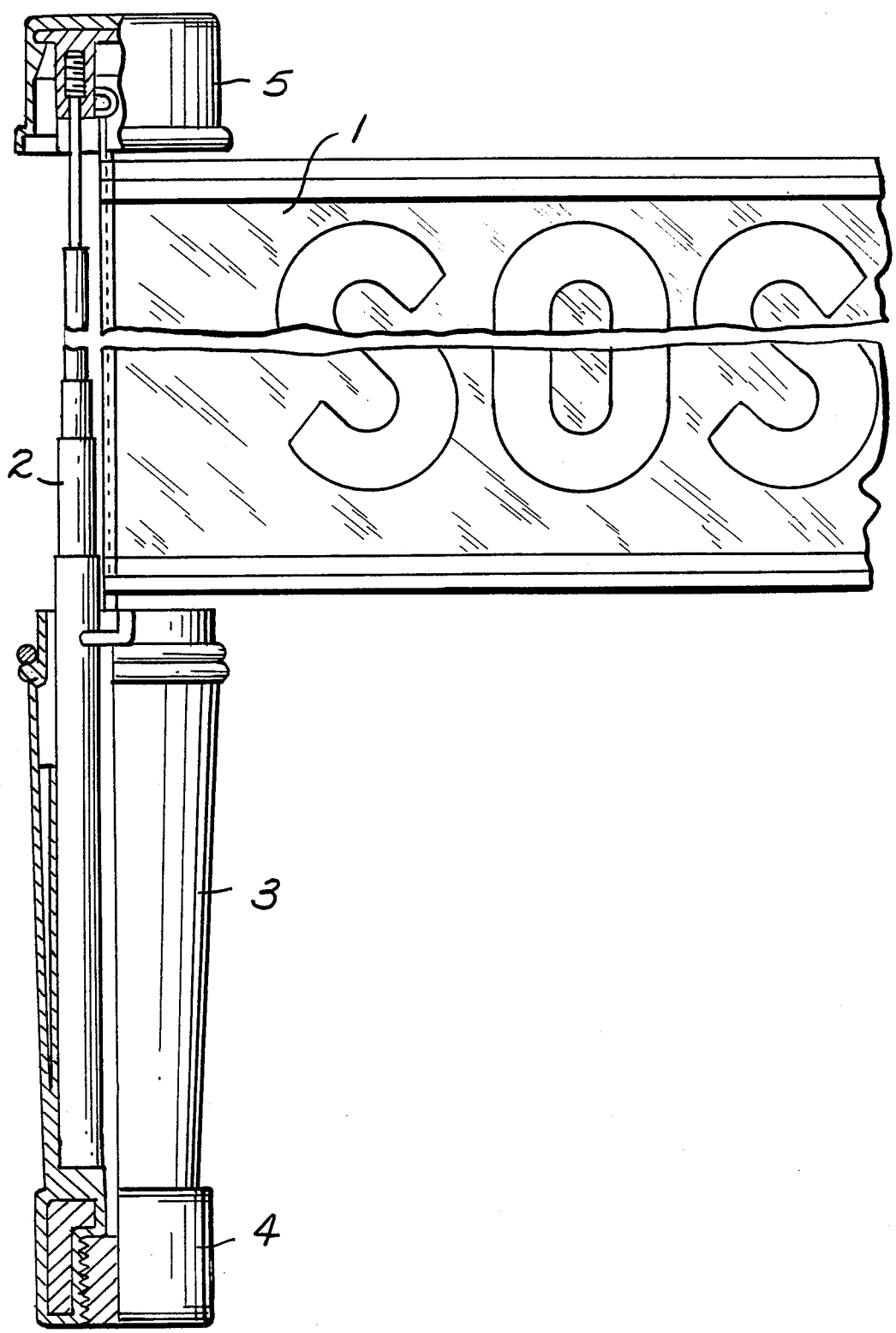
FIG. 1 is a partial sectional view of the signal flag of the invention.

As shown in FIG. 1, the signal flag of the invention comprises a flag 1 attached to a telescoping flagstaff 2 which, in turn, is fastened in the foot 4 of the case 3. The flagstaff 2 is fastened to the foot 4 of the case 3 offset from the center in order to provide a larger stowing capability in the case for the flag in the folded state. The flag 1 is fastened in the folded as well as in the unfolded state with its upper end to the cap 5 which also provides the attachment (not shown) of the telescoping staff by means of a pivotable intermediate element in the upper part of the cap.

Figure 2A:
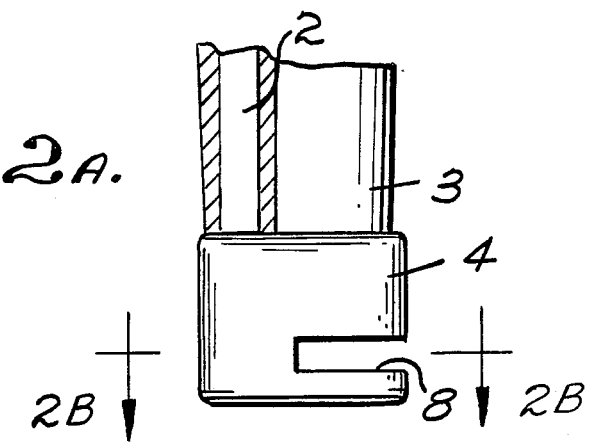
FIGS. 2 and 3 are schematic cross-sections of the foot element of the case.
Figure 2B:
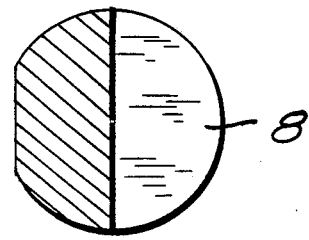
Figure 3:
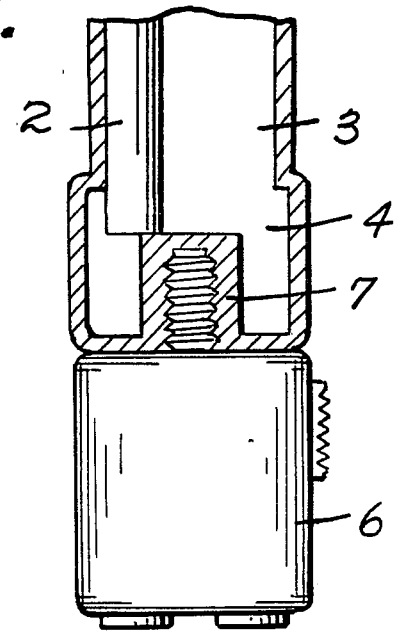

As shown in FIGS. 2 and 3, the conically downwardly tapering hollow case is provided with a foot which can be designed in different ways depending on the intended use. In the case 3 the flagstaff 2 is attached to the foot plate 4 which can be supplied with an adapter 7 for attaching a further signaling device 6, if desired. The further signaling device 6 can be a launcher for signal cartridges, for example.

The embodiment in accordance with FIG. 2, where the flagstaff 2 in the case 3 is also attached to the foot plate 4, is particularly useful when employing the signal flag of the invention on the road. However, this foot plate 4 has a slit 8, the inside width of which corresponds to the thickness of the customary window glass in automotive vehicles. Thus the signal flag can be fastened in a window of vehicle by means of this slit.

It is to be understood that the exemplary embodiment described above has been given by way of example only and that other variants and improvements are possible within the scope of the invention.

What is claimed is:

1. A signal device comprising a staff having a signalling means carried thereon and a receiving case for the staff and signalling means, said staff being connected to said receiving case and being collapsible to a size for fitting in said receiving case with said signalling means carried on said staff, said signalling means including a visually significant means, said case having a foot portion with said foot portion having fastening means for affixing said foot to a support, said case having an opening at one end thereof and being conically shaped so as to taper from said one end toward said foot, said staff having telescoping sections with a base section connected to said foot of said case, said case having a central axis and said staff being disposed in said case eccentrically with respect to said central axis, said case including a cap and said staff having one end attached adjacent the foot of said case and an opposite end attached to said cap.

2. The invention as claimed in claim 1, wherein said signalling means is a flag having highly reflective material thereon.

3. The invention as claimed in claim 1, wherein said foot portion includes a compartment for storage of another signalling means of a character different from said firstmentioned signalling means.

4. The invention as claimed in claim 3, wherein said another signalling means comprises an adapter means for a launching device for signal cartridges.

5. The invention as claimed in claim 1, wherein said fastening means comprises a slit having an inside width of a size for fitting over the edge of automotive window glass.

6. The invention as claimed in claim 1, wherein said cap is provided with a highly reflective material on the exterior thereof.

* * * * *